UNITED STATES PATENT OFFICE.

WESLEY W. HAMILTON, OF BROOKLYN, NEW YORK, ASSIGNOR TO DANIEL D. DENTON, TRUSTEE, OF SAME PLACE.

TREATING ANIMAL AND VEGETABLE FIBER FOR TEXTILES, CORDAGE, &c.

SPECIFICATION forming part of Letters Patent No. 332,513, dated December 15, 1885.

Application filed June 2, 1885. Serial No. 167,399. (No specimens.)

*To all whom it may concern:*

Be it known that I, WESLEY WASHINGTON HAMILTON, of Brooklyn, in the county of Kings and State of New York, have invented certain new and useful Improvements in Treating Animal and Vegetable Fibers for Textiles, Cordage, and other Uses, of which the following is a full, clear, and exact description.

My invention relates to the treatment of animal and vegetable fibers, whereby they are made more suitable for textiles, cordage, and other uses.

I have discovered, and by a series of experiments have demonstrated, that certain animal fibers—to wit, the hair that forms the coats of cattle and calves—and certain vegetable fibers—to wit, short jute, short flax, short ramee, and short pita—can, by a certain mechanical treatment, have imparted to them improved spinning and other useful properties—that is to say, that by said treatment they are curled, bent, waved, or twisted, and made more pliable and less slippery, and are thereby rendered more capable of being carded, made into webs or bats, and into slivers and rovings, and spun or twisted into yarns and twines, thus extending the economical use of many fibers to which textile and other useful properties have been imparted to many branches of the arts, and this I accomplish by subjecting to the novel process hereinafter described the raw material mentioned—to wit, the short hair of cattle and calves and short fibers of jute, flax, ramee, and pita—which, in their normal or commercial condition, do not possess these improved properties.

Clinging properties in short fibers are essential to good spinning results, and short fibers destitute of clinging power are of little or no value for textiles and analogous uses.

Wools and cottons possess clinging properties in a high degree, and their curliness contributes largely to their well-known spinning qualities.

Short, flat, straight, slippery vegetable fibers—such as the short fibers of jute, flax, ramee, and pita—and short straight animal hair—such as short cow-hair and short calf-hair—are deficient in clinging properties. This deficiency can be removed or materially lessened by subjecting the fibers named to the process hereinafter described, which will impart to them curliness, numerous fine indentations or impressions, remove or reduce their slipperiness, and make them more pliable. These changes made in the structural condition of the fibers render them more susceptible of undergoing the drawing and twisting operation of spinning, and the preparatory steps thereto.

By the term "curl" I do not mean "ringlet" form, but a bent, spiral, wavy, or twisted form. By the term "short fibers" I mean fibers that are naturally short and straight, and by reason thereof are lacking in spinning properties, and fibers that were naturally long and straight, but which have been reduced in length to such an extent that they have lost or have had materially impaired their economical spinning properties, and I mention as examples of these short cattle-hair and short jute.

Many attempts have been made, from time to time, to impart curl by chemical means to short straight vegetable fibers, to improve their spinnning properties; but I believe none of these attempts succeeded, and that there is now no process, either chemical or mechanical, known to the public by which curl is imparted to short straight vegetable fibers, thereby materially improving their spinning properties.

There are several well-known methods of imparting curl to long vegetable fibers, thereby improving their upholstering properties— as, for example, the "roping process," the "crimping process," and the process of winding the fibers around a heated spindle; but the curl imparted to the fibers by these processes is not intended to and does not, in any respect, improve their spinning properties.

I am aware that short animal-hair has been curled by means of caustic acid and caustic alkali, and its spinning properties greatly increased thereby; but that process is hurtful to the fibers and is very expensive; but I am not aware that there is any mechanical process now known to the public by which curls are imparted to short animal fibers whereby their spinning properties are improved.

In carrying my invention into practical effect I take medium coarse jute about two inches long, and if the fibers are not intermingled I intermingle them, so that they will lie more or less across and not parallel with each other. The amount of these fibers that is intended to be treated in one operation is then divided into four or five approximately equal parts. I take one of these parts and stuff it, while so intermingled, into a strong vessel of cylindrical form in its interior, and pack it down tightly therein by hand or by rammer, leaving the top of the packed fibers substantially even. The cylindrical vessel is made in two longitudinal sections, is firmly bound together by metal clamps and rings, is closed at the bottom by a removable plate fastened to it by hooks and eyes, is smooth inside, and has vents distributed in and about the bottom plate for the escape of air, and its height is four times as great as its internal diameter. Another of the parts of the fibers is then stuffed into the cylinder and packed down on the first part in like manner, and this is repeated until all of the parts that are to be treated in one operation are in the cylinder, and the cylinder is nearly full of fibers. For convenience of reference, I will call this the "preliminary packing." Upon this charge of fibers I superimpose a thick metal plate fitting snugly to the interior of the cylinder, but free enough to move therein without binding. Upon this plate I apply strong pressure through a piston or follower, so as to compress the intermingled fibers between the top and bottom plates and against the inner surface of the cylinder. In the instance given I employ pressure sufficient to pack sixty-five pounds of the fibers into the space of one cubic foot and maintain the pressure long enough to give the fibers under compression a "set" or deadened compaction—say about five minutes. This operation I will call the "pressure treatment." The pressure is then removed from the fibers and the compressed fibers are removed from the cylinder. The mass of compressed fibers I will call the "plug of fibers."

The object and effect of dividing the fibers to be treated in one operation into several parts, and then packing them down separately in the cylinder, as described in the operation of preliminary packing, is to make the plug of fibers after the pressure treatment separate into sections at the points where the parts were rammed down in the preliminary packing, and thus prepare it for the next operation, which I will call the "reverse pressure." The plug of fibers is then divided into sections, and the sections put into the cylinder, but in a position therein the reverse of that they occupied during the pressure treatment—that is to say, the parts of the plug of fibers that were then in a horizontal position in the cylinder are now put therein in a perpendicular position, so as to receive upon their sides a reverse pressure. The reverse pressure is then administered to the fibers to the same degree as in the pressure treatment, which again converts them into a plug of fibers. The plug of fibers is then removed from the cylinder preparatory to opening out the fibers for use. To facilitate the opening, I first put sufficient pressure upon the sides of the plug of fibers to relax it from its compaction, then partially open out the fibers by hand, after which they are finally opened out in any suitable way, such as by pickers and cards. When the fibers are opened out, it will be found that the formerly straight fibers are now curly, are more pliable, are less slippery, and greatly resemble curly wool in appearance, and are more available for being carded, made into webs and bats, and into slivers and rovings, and for being spun or twisted into yarns and twines, and for other useful purposes.

For some uses and on some fibers—such, for example, as coarse jute four or five inches long, which is intended to be used in making coarse common yarns, such as are used in making gunny-bagging, and where but a small degree of curl is desired to be imparted—the reverse pressure, and consequently the separating the intermingled fibers into parts, may be dispensed with, while in other cases—for example, where a great degree of curl is desired to be imparted to short, stubby, wiry, slippery cattle-hair—the reverse pressure may be several times repeated, if desired.

I have found that seventy-five pounds of either cattle-hair or short flax or sixty-five pounds of either short ramee or short pita compressed into the space of one cubic foot by my process yields good curl results.

I do not limit myself to the kinds of short animal-hair and vegetable fibers herein mentioned as examples, as the process can be applied with advantage to various other kinds of hair and fiber.

Having thus described my invention, what I claim as new, and desire to secure by Letters Patent, is—

1. The process of treating animal and vegetable fibers, such as herein specified, for textiles, cordage, and other uses, which consists in first intermingling the fibers, then packing the said fibers into a cylindrical vessel, then applying strong pressure to the fibers, and then removing the plug of fibers thus formed and opening out the fibers, substantially as described.

2. The process of treating animal and vegetable fibers, such as herein specified, for textiles, cordage, and other uses, which consists in first intermingling the fibers, then dividing them into four or five nearly equal parts and packing the said parts separately and successively into a cylindrical vessel, then applying strong pressure to the fibers and maintaining it awhile, then removing from the cylinder the plug of fibers thus formed and separating it into sections, then packing the sections separately and successively and in reverse positions into the cylindrical vessel, then applying strong pressure to the fibers and maintaining it awhile, then removing from the cylinder the plug of fibers thus formed and relaxing its compaction by applying pressure to its sides, then opening out the fibers, substantially as herein described.

3. As a new article of manufacture, animal and vegetable fibers curled, indented, and made more pliable by strong pressure, thus rendering them better adapted to be carded, made into webs or bats and into slivers and rovings, and to be spun or twisted into yarn and twine, substantially as herein described.

WESLEY W. HAMILTON.

Witnesses:
 JAMES T. GRAHAM,
 EDGAR TATE.